United States Patent
Fabri et al.

(10) Patent No.: US 9,981,861 B2
(45) Date of Patent: May 29, 2018

(54) MODIFIED WALNUT SHELL AND USE

(71) Applicant: Polymer Ventures Inc., Charleston, SC (US)

(72) Inventors: Jonathan Fabri, Charleston, SC (US); David Beyer, Paducah, KY (US)

(73) Assignee: Polymer Ventures Inc., Charleston, SC (US)

( * ) Notice: Subject to any disclaimer, the term of this patent is extended or adjusted under 35 U.S.C. 154(b) by 0 days. days.

(21) Appl. No.: 15/790,880

(22) Filed: Oct. 23, 2017

(65) Prior Publication Data

US 2018/0044203 A1  Feb. 15, 2018

Related U.S. Application Data

(63) Continuation of application No. PCT/US1657/000993, filed on Oct. 20, 2016.

(60) Provisional application No. 62/244,428, filed on Oct. 21, 2015.

(51) Int. Cl.

| | |
|---|---|
| *B01J 20/22* | (2006.01) |
| *B01D 15/04* | (2006.01) |
| *C02F 1/28* | (2006.01) |
| *B01D 17/02* | (2006.01) |
| *B01J 20/32* | (2006.01) |
| *B01J 20/34* | (2006.01) |
| *B01D 15/20* | (2006.01) |
| *C02F 101/32* | (2006.01) |

(52) U.S. Cl.
CPC .............. *C02F 1/286* (2013.01); *B01D 15/20* (2013.01); *B01D 17/0202* (2013.01); *B01J 20/3206* (2013.01); *B01J 20/3425* (2013.01); *B01J 20/3475* (2013.01); *B01J 2220/485* (2013.01); *C02F 2101/32* (2013.01)

(58) Field of Classification Search
CPC ... C02F 1/286; C02F 2101/32; B01J 20/3425; B01J 20/3206; B01J 20/3475; B01J 2220/485; B01D 15/20; B01D 17/0202

USPC ........................................................ 210/691
See application file for complete search history.

(56) References Cited

U.S. PATENT DOCUMENTS 3,992,291 A   11/1976   Hirs
6,627,084 B2   9/2003   Murphy et al.

FOREIGN PATENT DOCUMENTS

CN        103007897 B       1/2015

OTHER PUBLICATIONS

Opta Minerals, "https://web.archive.org/web/20170425212628/https://www.optaminerals.com/Abrasives/Walnut-Shells.html" Dated Apr. 25, 2017, and Accessed Jan. 2018. (Year: 2017).*
Keshaev et al. "Deep Bed Nutshell Filter Evolution", 20th Annual Produced Water Society Seminar, 2010.
Wan Ngah et al., Removal of heavy metal ions from wastewater by chemically modified plant wastes as adsorbents: A review, Bioresource Tech. 2008, 99, 3935-3948.
Written Opinion of the ISA for international application No. PCT/US16/57993.

* cited by examiner

*Primary Examiner* — Haytham Soliman

(57) ABSTRACT

Herein are described compositions useful in the purification of hydrocarbon-contaminated liquids (e.g., oil-contaminated water), methods of their manufacture, and methods of their use. In one instance, the composition can include a porous agricultural substrate selected from the group consisting of walnut shell, pecan shell, apricot pit, peach pit, corn cob, and a mixture thereof; the porous agricultural substrate having an external surface and pores, wherein the external surface is hydrophilic; and an organo-amine carried within the pores of the porous agricultural substrate. These compositions are utilized as regenerable filter media in place of, for example, ground walnut media.

19 Claims, No Drawings

MODIFIED WALNUT SHELL AND USE

CROSS-REFERENCE TO RELATED APPLICATIONS

This disclosure is a continuation of international application no. PCT/US16/57993, filed 20 Oct. 2016, which claims the benefit of priority to U.S. Provisional Patent Application No. 62/244,428, filed 21 Oct. 2015, each incorporated by reference herein in their entirety.

FIELD OF THE INVENTION

The present invention relates to modified blasting grit for the removal of contaminants from liquids, method of manufacturing these modified blasting grit, and the use and regeneration of these modified blasting grit.

BACKGROUND

Deep bed media filtration is used to remove fine oil droplets and solids from oil-contaminated water before disposal, or to remove particulate material from water prior to use in, for example, waterflood injection. After a filtration cycle, the bed is loaded with contaminants (e.g., oil and solids) and loses its effectiveness. The bed can further clog thereby preventing fluid from passing through the filter system. Notably, contaminant-loading causes pressure drops across the bed and may lead to a fracture in the filter media. Fractures allow oil and solids to bypass the filter bed matrix and contaminate the outflow. Depending on the filter media, the media can be replaced (i.e. when the media is activated carbon or modified clay) or backwashed to remove contamination (i.e. when the media is sand or ground nutshells).

Recyclable or regenerable filter media (commonly ground nutshells) is preferable in view of cost and waste generation. These media beds are periodically backwashed to remove the dirt and contamination from the filter media; the dirt and contamination is then disposed or reclaimed.

The backwash process is, as the name suggests, a reversal of the flow accompanied by an agitation of the filter media to "shake loose" the adhered contaminates. In the case of oil-contaminated water, the process is understood to be facilitated by the de-agglomeration of the filter media from oil droplets. The oil, loosely bound to the surface of the filter media and surrounded by multiple particulates of the filter media, is then carried out of the filter system for recycling or disposal.

The oil removal efficiency of regenerable filter media is dependent on the flux of the contaminated water through the filter bed (generally reported as gpm/ft$^2$) and the oil-droplet size (generally reported as turbidity). Due to the mechanism of oil adhesion, ground nutshell media is limited to low flux rates and large oil-droplet sizes (higher turbidity). Despite over fifty years of industrial use, improvements to regenerable filter media have been elusive.

SUMMARY

A first embodiment includes a composition for purifying contaminated liquids, the composition comprising an blasting grit, preferably an agricultural substrate selected from the group consisting of walnut shell, pecan shell, apricot pit, peach pit, corn cob, and a mixture thereof; more preferably, the agricultural substrate is porous and has an external surface and pores, wherein the external surface is hydrophilic; and an organo-amine carried within the pores of the porous agricultural substrate.

A second embodiment includes a method of modifying a porous agricultural substrate. The method includes hydrating the porous agricultural substrate; then contacting the porous agricultural substrate with an organo-amine; and affixing the organo-amine into pores of the porous agricultural substrate.

A third embodiment includes a solution purification process that includes flowing a contaminated solution through a filter media at a process flux rate; the filter media comprising a porous agricultural substrate selected from the group consisting of walnut shell, pecan shell, apricot pit, peach pit, corn cob, and a mixture thereof; the porous agricultural substrate having an external surface and pores, wherein the external surface is hydrophilic; and an organo-amine carried within the pores of the porous agricultural substrate; and adsorbing a contaminant onto the filter media from the contaminated solution.

DETAILED DESCRIPTION

Herein is described a composition for purifying contaminated liquids. The composition, preferably, includes a modified blasting grit, where the modified blasting grit including a blasting grit and an organo-amine, that is, a blasting grit modified by the organo-amine. Alternatively, the composition can be understood to include porous agricultural substrate (e.g., those used as soft blasting grit) modified by an organo-amine.

Blasting grit is the common name for a group of particulate materials utilized for abrasive surface conditioning. The most common example is sand blasting where sand is communicated to a surface under a pressurized flow (air or pneumatic blasting). The blasting grit used herein can be graded based on a grit size (e.g., 16, 20, 24, 30, 36, 46, 54, 60, 70, 80, 90, 100, 120, 150, 180, or 220 grit) which corresponds to an average particle size (e.g., 1092, 942, 686, 559, 443, 356, 305, 254, 203, 165, 145, 122, 102, 89, 76, or 62 μm, respectively).

In one preferred embodiment, the blasting grit is agricultural blasting grit. That is, the blasting grit is manufactured from an agricultural product and is not a mineral, metal, or plastic. Agricultural blasting grit is, preferably, a porous agricultural substrate and can be selected from the group consisting of walnut shell, pecan shell, apricot pit, peach pit, corn cob, and a mixture thereof. In a preferred example, the porous agricultural substrate is walnut shell, for example, black-walnut shell. When the modified porous agricultural substrate is a modified walnut shell, the walnut shell is preferably a crushed (powdered, ground) walnut shell, and the composition includes the modified walnut shell which is a crushed walnut shell and an organo-amine (wherein the crushed walnut shell carries the organo-amine). In another preferred example, the porous agricultural substrate is pecan shell. In still another preferred example, the porous agricultural substrate is corn cob. In yet another preferred example, the porous agricultural substrate is a ground pit, for example ground apricot pit and/or ground peach pit.

As described, the porous agricultural substrate is modified by an organo-amine. Preferably, the organo-amine includes at least one alkyl group having the formula —$(C_xH_y)$, where x is an integer from about 6 to about 30; in one instance, y can be equal to 2x+1 or 2x. In another instance, the organo-amine can include a plurality of alkyl groups each, individually, having the formula —$(C_xH_y)$, where x is an integer from about 6 to about 30. In one instance, the organo-amine has a formula $N(R^1)(R^2)(R^3)$, where $R^1$, $R^2$, and $R^3$ are individually selected from a hydrogen atom, an alkyl group, an alkenyl group, and an alkynyl group; wherein, preferably, at least one of $R^1$, $R^2$, and $R^3$ is an alkyl group.

In another instance, the organo-amine can be selected from oleyl amine, tallow amine, hydrogenated tallow amine, octylamine, dodecylamine, hexadecylamine, octadecylamine, N-tallowalkyl-1,3-diaminopropane, cocoalkylamine, dihydrogenated tallowalkylamine, trihexadecylamine, octadecyldimethylamine, dihydrogenated tallowalkylmethylamine, dioctadecylamine, or a mixture thereof. In still another instance the organo-amine can be selected from octyl amine; lauryl amine; stearyl amine; oleyl amine; cetylamine; N-tetradecylamine; cocoamine; alkyl($C_{16}$ and $C_{18}$-unsaturated) amine; alkyl($C_{14-18}$) amine; alkyl($C_{16-22}$)amine; alkyl($C_{8-18}$ and $C_{18}$-unsaturated) amine; alkyl($C_{12-18}$)amine; di(hydrogenated tallow)amine; dicocoalkyl amine; dialkyl($C_{14-18}$) amine; dialkyl($C_{12-18}$) amine; dialkyl($C_{16-22}$)amine; N-tridecyltridecanamine; N-methylstearylamine; distearyl amine; dialkyl($C_{8-20}$) amine; N-octadecylbenzylamine; N-isopropyloctadecylamine; N-hexadecyloctadecylamine; dimantine; N-methyldioctadecylamine; dimethyl palmitamine; cocodimethylamine; alkyl($C_{10-16}$) dimethyl amine; alkyl($C_{14-18}$)dimethyl amine; alkyl($C_{16-18}$ and $C_{18}$-unsaturated)dimethyl amine; alkyl($C_{16-18}$)dimethyl amine; alkyl ($C_{12-18}$)dimethyl amine; alkyl($C_{16-22}$)dimethyl amine; oleyldimethylamine; N-methyldidecylamine; N,N-dioctylmethylamine; dicocomethylamine; dihydrogenated tallowmethyl amine; trialkyl($C_{6-12}$) amine; N,N-dioctyloctyl amine; trialkyl($C_{8-10}$) amine; cocopropylenediamine; laurylpropylenediamine; N-dodecylpropylenediamine; laurylamine dipropylenediamine; N-(tallow alkyl)dipropylenetriamine; N-(tallow alkyl)dipropylenetriamine; N-stearoyltetraethylenetetramine; and a mixture thereof.

In a preferred embodiment, the organo-amine is an alkylamine base that is selected from the group consisting of primary, secondary, and tertiary alkylamines. In a preferred embodiment, the alkylamine base has the chemical structure $R_1R_2R_3N$ where at least one of the R groups is an alkyl group containing 6-30 carbon atoms and the other R groups can represent hydrogen atoms. It is more preferred that the alkyl group have from about 10 to 30 carbons and even more preferred that it is has about 12 to 30 carbons. Alternatively, a preferred alkyl group is one that has at least about 12 carbons, or more. The preferred alkylamine base is characterized as being nonionic. It is also preferred that the alkyamine base is nonamphoteric. It is believed that incorporation of ionic functional groups onto the subject alkylamines would decrease the amphiphilic nature of the resulting composition, thereby reducing a desirable property of the composition.

A preferred alkylamine base is a fatty alkylamine and more preferably the alkylamine base is a primary fatty alkylamine. A preferred alkylamine base is insoluble in water, and has not been chemically modified prior to contacting it with the porous agricultural substrate.

A preferred arrangement of the modified porous agricultural substrate includes the organo-amine carried in pores of the porous agricultural substrate. That is, the porous agricultural substrate preferably has a structure that includes an external surface and pores. The pores can be breaks in the external surface or deep fissures to areas within the interior of the porous agricultural substrate. Often the surface and the pore have different topological structure and can be identified under magnification. Typically, a pore is at least as deep as its narrowest width. The organo-amine is preferably located in, or carried in, the pores of the porous agricultural substrate, for example on the walls of the pores. In another preferred arrangement, the organo-amine is not carried by the external surface of the porous agricultural substrate.

In some instances the location of the organo-amine can be controlled by the population of the pores of the porous agricultural substrate and the weight ratio of the porous agricultural substrate to the organo-amine. In instances, the modified porous agricultural substrate can include about 99.5 wt. % to about 60 wt. % of the porous agricultural substrate and about 0.5 wt. % to about 40 wt. % of the organo-amine; about 99 wt. % to about 70 wt. % of the porous agricultural substrate and about 1 wt. % to about 30 wt. % of the organo-amine; about 98 wt. % to about 80 wt. % of the porous agricultural substrate and about 2 wt. % to about 20 wt. % of the organo-amine; about 97 wt. % to about 85 wt. % of the porous agricultural substrate and about 3 wt. % to about 15 wt. % of the organo-amine; about 95 wt. % to about 85 wt. % of the porous agricultural substrate and about 5 wt. % to about 15 wt. % of the organo-amine; or about 90 wt. % of the porous agricultural substrate and about 10 wt. % of the organo-amine. In another instance, the modified porous agricultural substrate consists of the porous agricultural substrate and the organo-amine. In still another instance, the modified porous agricultural substrate consists of the porous agricultural substrate and the organo-amine wet by a solvent (e.g., water, a glycol, or an alcohol). In yet another instance, the modified porous agricultural substrate consists of the porous agricultural substrate and the organo-amine and the modified porous agricultural substrate is carrying an oil.

In preferred embodiments, the modification of the porous agricultural substrate has an effect on the interaction of the porous agricultural substrate with water and oils. In one preferable instance, the composition (modified porous agricultural substrate) is hydrophobic and oleophilic. In another instance, the composition is hydrophilic and oleophilic, e.g., the modified porous agricultural substrate is amphiphilic. In yet another instance, the composition is hydrophilic yet shows a pronounced interaction with oils while not wetting when applied to a solution that is just oil (a modified amphiphilic material).

In another embodiment, the modified porous agricultural substrate can be produced by admixing a porous agricultural substrate and an organo-amine. In one instance, the modification of the porous agricultural substrate includes contacting a porous agricultural substrate with an organo-amine so that the organo-amine is absorbed into pores of the porous agricultural substrate. One variation in the process can include contacting the porous agricultural substrate with the organo-amine at a temperature above an organo-amine melting point. In another variation, the process can include contacted with an admixture of the organo-amine and a solvent. Preferably, wherein the organo-amine is soluble in or miscible with the solvent. More preferably, the solvent has a boiling point in the range of about 50° C. to about 200° C., about 60° C. to about 175° C., about 75° C. to about 150° C., or about 80° C. to about 140° C. In some instances, the solubility of the organo-amine can be improved by dissolution in a heated solution of the solvent, accordingly the method can include admixing the porous agricultural substrate with the organo-amine at a temperature between about 30° C. and the boiling point of the solvent, preferably between about 40° C. and 10° C. below the boiling point of the solvent. Examples of the solvent include toluene, xylene, ethylene glycol, isopropanol, ethanol, methanol, water, tetrahydrofuran, diethylether, acetone, methylethylketone, water, dichloromethane, ethylene chloride, n-propylbromide, and mixtures thereof. Preferably, the solvent is water.

Methods of preparation of the composition include providing a vessel to contact the porous agricultural substrate and an organo-amine. Such vessels can include stirred vessels, rotating vessels, static vessels, ovens, kilns, dryers, and cartridges. The organo-amine can be applied as a neat liquid or preferably as a solution, with the use of spray nozzles or bars or other suitable means to deliver a liquid into contact with a solid. Preferably, a means is provided to heat the porous agricultural substrate to assist in removing the solvent and residual moisture. In one embodiment, the modified porous agricultural substrate is dried at a temperature between 20 and 250° C. Preferably, the modified porous agricultural substrate is dried at a temperature between 40 and 150° C., and most preferably the modified porous agricultural substrate is dried at a temperature between 50 and 100° C.

In certain instances, the absorption of the organo-amine by the porous agricultural substrate is enhanced by the hydration of the porous agricultural substrate prior to the addition of the organo-amine. In one example the porous agricultural substrate is hydrated, for example with water, prior to contacting the porous agricultural substrate with the organo-amine.

In another embodiment, the herein described modified porous agricultural substrate can be used for the purification of polar-protic solvents that are contaminated with nonpolar-aprotic materials. In one instance, the modified porous agricultural substrate is utilized in a purification apparatus. The purification apparatus can include a main filter vessel fluidly connected to an influent and an effluent; where the main filter vessel houses the modified porous agricultural substrate filter media that includes an porous agricultural substrate carrying an organo-amine in pores of the porous agricultural substrate. In another instance, the modified porous agricultural substrate is utilized in a solution purification process that can include flowing a contaminated solution through a filter media that includes a modified, porous agricultural substrate.

Flowing a contaminated solution through the filter media implicitly includes a process flux rate, the flow rate of the contaminated solution commonly reported in terms of gallons per minute per square foot. That is, the flux rate is a measure of the flow rate through a cross-section of the filter media. The flux rate is preferably greater than about 12, 13, 14, 15, 16, 17, 18, 19, or 20 gpm/ft$^2$. In another instance, the process flux rate can be in a range of about 15 to about 30 gpm/ft$^2$, about 15 to about 25 gpm/ft$^2$, or about 15 to about 20 gpm/ft$^2$.

As described above, the contaminated solution can be a mixture of polar-protic solvents and nonpolar-aprotic materials. In one instance, the contaminated solution is a mixture of polar and non-polar fluids. The polar-protic solvent can be, for example, water, a glycol, a glycerol, or a mixture thereof. The nonpolar-aprotic material can be an oil, a medium chain hydrocarbon (diesel), and/or a short chain hydrocarbon (gasoline). In one particular instance, the nonpolar-aprotic material is oil, for example, crude oil (light and/or heavy). In another particular instance, the contaminated solution is a waste-water product for oil extraction; for example produced water. In another instance, the contaminated solution is an oil-in-water emulsion.

In one example, the oil-in-water emulsion includes a plurality of oil droplets; where, preferably, the oil droplets are smaller than 20 µm, 10 µm, 5 µm or 1 µm. The process of removing the nonpolar-aprotic material from the contaminated solution includes removing the plurality of oil droplets smaller than 20 µm, 10 µm, 5 µm or 1 µm; preferably, removing greater than 50%, 60%, 70%, 80%, 90%, or 95% of the oil droplets in the contaminated solution. In one instance, the removal of oil can from a contaminated water solution can be determined from the before and after concentrations of oil in the solution and the turbidity of the solution.

In another instance, the process includes, or the modified blasting grit provides, an oil-in-water removal efficiency of at least 95%, 96%, 97%, 98%, or 99% for a 335 ppm oil in water emulsion. In still another instance the process includes, or the modified blasting grit provides, a turbidity removal efficiency of at least 85%, 86%, 87%, 88%, 89%, 90%, 91%, 92% 93%, or 94%. Preferably, turbidity removal efficiency is at least 90%, 91%, 92% 93%, or 94% for an oil in water emulsion that has an initial turbidity of about 44 (NTU). Preferably, turbidity removal efficiency is at least 90%, 91%, 92% 93%, or 94% for an oil in water emulsion that has an initial turbidity of about 85 (NTU). Preferably, turbidity removal efficiency is at least 85%, 86%, 87%, 88%, 89%, or 90% for an oil in water emulsion that has an initial turbidity of about 128 (NTU).

The process can further include regenerating the filter media. That is, the removal of the nonpolar-aprotic material produces a "spent" or contaminated filter media, this spent-filter media can be regenerated by the removal or recover of the nonpolar-aprotic material form the spent-filter media. In one instance, the nonpolar-aprotic material can be recovered from the spent filter media by aggressive back flow, extraction, distillation, or other methods.

In another embodiment, the modified porous agricultural substrate is added to the contaminated liquid and the contaminant is substantially absorbed, allowing for removal of the modified porous agricultural substrate as a solid or slurry. In a further embodiment, a finely divided modified porous agricultural substrate is added to the contaminated liquid and separated optionally with assistance from coagulants or flocculants. Alternatively, the modified porous agricultural substrate is added and mixed with the contaminated liquid until the mixture solidifies for removal or disposal. In each method, the modified porous agricultural substrate provides a means to separate the contaminants from the bulk of the remaining liquid.

The contaminated liquids to be treated by the subject compositions include aqueous and nonaqueous systems, salt water, produced water, and systems containing toxic, hazardous, or undesirable materials. Specifically, the liquids can contain contaminants selected from the group consisting of oil, grease, hydrocarbons, pesticides, heavy metals, radioactive waste, colored materials, odor-causing materials, suspended solids, turbidity, haze, paint, solvents, resins, condensate, bilge water, industrial effluent, deinking waste, surfactants, emulsified materials, microorganisms, MTBE, BTEX, BOD, COD, and combinations thereof.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

What is claimed:

1. A solution purification process comprising:
flowing an oil contaminated fluid through an amphiphilic filter media at a process flux rate; the amphiphilic filter media comprising a porous agricultural substrate having a hydrophilic external surface and oleophilic pores which carry an organo-amine, wherein the porous agricultural substrate is walnut shell;
adsorbing oil into the pores of the amphiphilic filer media; then
desorbing the adsorbed oil from the amphiphilic filter media and forming a regenerated filter media; and then
flowing oil-in-water dispersion through the regenerated filter media; adsorbing oil into the pores of the regenerated filer media; then desorbing the adsorbed oil from the regenerated filter media.

2. The process of claim 1, wherein the process flux rate is greater than about 10 gpm/ft$^2$.

3. The process of claim 1, wherein the process flux rate is in a range of about 15 to about 20 gpm/ft$^2$.

4. The process of claim 1, wherein the oil contaminated fluid includes a 5 to 1500 ppm of oil; and wherein the filter media removes at least 80% of the oil from the oil contaminated fluid.

5. The process of claim 4, wherein the dispersion includes a plurality of oil droplets smaller than 20 μm; and the filter media removes the oil droplets.

6. The process of claim 1, wherein the porous agricultural substrate is selected from a crushed walnut shell, a crushed pecan shell, and a mixture thereof.

7. The process of claim 1, wherein the organo-amine includes at least one alkyl group having the formula —($C_xH_y$), where x is an integer from about 6 to about 30.

8. The process of claim 7, wherein the organo-amine includes a plurality of alkyl groups each, individually, having the formula —($C_xH_y$), where x is an integer from about 6 to about 30.

9. The process of claim 1, wherein the organo-amine has a formula $N(R^1)(R^2)(R^3)$, where $R^1$, $R^2$, and $R^3$ are individually selected from a hydrogen atom, an alkyl group, an alkenyl group, and a alkynyl group; wherein at least one of $R^1$, $R^2$, and $R^3$ is an alkyl group.

10. The process of claim 1, wherein the organo-amine is selected from oleyl amine, tallow amine, hydrogenated tallow amine, octylamine, dodecylamine, hexadecylamine, octadecylamine, N-tallowalkyl-1,3-diaminopropane, cocoalkylamine, dihydrogenated tallowalkylamine, trihexadecylamine, octadecyldimethylamine, dihydrogenated tallowalkylmethylamine, dioctadecylamine, or a mixture thereof.

11. The process of claim 1, wherein the amphiphilic filter media includes about 99.5 wt. % to about 60 wt. % of the porous agricultural substrate and about 0.5 wt. % to about 40 wt. % of the organo-amine.

12. An amphiphilic filter media consisting of
a porous agricultural substrate and an organo-amine;
the porous agricultural substrate having an external surface and pores, where the external surface is hydrophilic;
the organo-amine carried in the pores of the porous agricultural substrate, the organo-amine not carried on the external surface of the porous agricultural substrate;
wherein the porous agricultural substrate is walnut shell;
wherein the filter media is amphiphilic.

13. The amphiphilic filter media of claim 12, wherein the porous agricultural substrate further comprises pecan shell, apricot pit, peach pit, corn cob, or a mixture thereof.

14. The amphiphilic filter media of claim 12, wherein the organo-amine includes at least one alkyl group having the formula —($C_xH_y$), where x is an integer from about 6 to about 30.

15. The amphiphilic filter media of claim 14, wherein the organo-amine includes a plurality of alkyl groups each, individually, having the formula —($C_xH_y$), where x is an integer from about 6 to about 30.

16. The amphiphilic filter media of claim 12, wherein the organo-amine has a formula $N(R^1)(R^2)(R^3)$, where $R^1$, $R^2$, and $R^3$ are individually selected from a hydrogen atom, an alkyl group, an alkenyl group, and a alkynyl group; wherein at least one of $R^1$, $R^2$, and $R^3$ is an alkyl group.

17. The amphiphilic filter media of claim 12, wherein the organo-amine is selected from oleyl amine, tallow amine, hydrogenated tallow amine, octylamine, dodecylamine, hexadecylamine, octadecylamine, N-tallowalkyl-1,3-diaminopropane, cocoalkylamine, dihydrogenated tallowalkylamine, trihexadecylamine, octadecyldimethylamine, dihydrogenated tallowalkylmethylamine, dioctadecylamine, or a mixture thereof.

18. The amphiphilic filter media of claim 12 consisting of about 99.5 wt. % to about 60 wt. % of the porous agricultural substrate and about 0.5 wt. % to about 40 wt. % of the organo-amine.

19. The process of claim 1, wherein the porous agricultural substrate further comprises pecan shell, apricot pit, peach pit, corn cob, or a mixture thereof.

* * * * *